United States Patent
Kamin, III

(10) Patent No.: US 9,774,630 B1
(45) Date of Patent: Sep. 26, 2017

(54) ADMINISTRATION OF MULTIPLE NETWORK SYSTEM WITH A SINGLE TRUST MODULE

(75) Inventor: Raymond A. Kamin, III, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 888 days.

(21) Appl. No.: 12/568,616

(22) Filed: Sep. 28, 2009

(51) Int. Cl.
    *H04L 29/06* (2006.01)
    *H04L 9/32* (2006.01)
    *H04L 9/08* (2006.01)

(52) U.S. Cl.
    CPC ............ *H04L 63/18* (2013.01); *H04L 9/0827* (2013.01); *H04L 9/3215* (2013.01); *H04L 63/20* (2013.01)

(58) Field of Classification Search
    CPC ....... H04L 9/08; H04L 9/0802; H04L 9/0816; H04L 9/083; H04L 63/18; H04L 63/20; H04L 63/205; H04L 9/3215; H04L 9/0827; H04L 12/4641; G06F 21/42; G06F 21/606
    USPC .......................................................... 380/278
    See application file for complete search history.

(56) References Cited

U.S. PATENT DOCUMENTS

| | | | |
|---|---|---|---|
| 6,614,800 B1* | 9/2003 | Genty | H04L 12/4641 370/464 |
| 6,662,228 B1* | 12/2003 | Limsico | H04L 63/04 709/225 |
| 6,993,521 B2 | 1/2006 | Aull | |
| 2002/0069278 A1* | 6/2002 | Forslow | H04L 63/0227 709/225 |
| 2005/0132229 A1 | 6/2005 | Zhang et al. | |
| 2005/0175183 A1* | 8/2005 | Ovadia et al. | 380/278 |
| 2006/0026422 A1 | 2/2006 | Bade et al. | |
| 2006/0242685 A1* | 10/2006 | Heard et al. | 726/3 |
| 2007/0204153 A1 | 8/2007 | Tome et al. | |
| 2008/0022377 A1* | 1/2008 | Chen et al. | 726/5 |
| 2008/0046758 A1 | 2/2008 | Cha et al. | |
| 2008/0046898 A1 | 2/2008 | Molina et al. | |
| 2009/0034738 A1* | 2/2009 | Starrett | 380/278 |
| 2009/0300596 A1* | 12/2009 | Tyhurst | G06F 8/65 717/173 |
| 2010/0017608 A1* | 1/2010 | Larsen | 713/168 |

(Continued)

OTHER PUBLICATIONS

Wikipedia, "Public-Key Cryptography", Aug. 31, 2009.
Wikipedia, "Trusted Computing", Aug. 31, 2009.

*Primary Examiner* — Edward Zee
*Assistant Examiner* — Chi Nguy
(74) *Attorney, Agent, or Firm* — Daniel M. Barbieri; Donna P. Suchy; Angel N. Gerdzhikov

(57) ABSTRACT

A trust module suitable for providing and managing network administration across multiple networks with different security levels. The trust module comprises an administration module to provide secure communication rules between and among the networks that define the manner in which the networks exchange secure communication over a data channel. The administration module includes a user interface to enable an administrator to define the secure communication rules and an encryption module to encrypt the secure communication rules. Advantageously, the trust module of the present invention allows for secure communication and attestation across an unsecure network and a secure network.

20 Claims, 3 Drawing Sheets

(56) References Cited

U.S. PATENT DOCUMENTS

2010/0037321 A1* 2/2010 Oz et al. .......................... 726/24
2011/0060947 A1* 3/2011 Song ....................... G06F 21/53
714/37

* cited by examiner

ADMINISTRATION OF MULTIPLE NETWORK SYSTEM WITH A SINGLE TRUST MODULE

BACKGROUND

This invention relates to secure communication between networks and more particularly to administration and attestation of multiple networks that may intercommunicate at different security levels.

In many modern network communication systems, maintaining reliability and security of the information being exchanged is a significant concern. It is generally accepted that providing security in both software and hardware components may provide the greatest protection. At the hardware level, establishing security may be difficult because much of the hardware components' semi-conductors are manufactured off-shore from un-trusted sources. However, administrators of secure computer networks frequently desire to take advantage of the off-shore manufactured components to keep network costs down.

Network hardware sourced from different manufacturers, however, sometimes raises intercommunication difficulties as each network may utilize it own proprietary authentication and/or encryption/decryption scheme. In addition, managing authentications and security levels between and among the various networks is typically done on an ad hoc basis with no central administration. As a result, security breaches may occur or authorized communication may be impeded.

Accordingly, there is a need to provide and manage secure administration and attestation across diverse networks that may operate at different security levels.

SUMMARY

According to the present invention, there is provided a trust module suitable for providing and managing network administration across multiple networks with different security levels. The networks communicate with the trust module over a control channel which is independent of the data channel and through which encrypted secure communication rules are provided to a local encryption/decryption module of the respective networks.

The trust module comprises an administration module to provide secure communication rules between and among the networks that define the manner in which the networks exchange secure communication over a data channel. The administration module includes a user interface to enable an administrator to define the secure communication rules and an encryption module to encrypt the secure communication rules. A key administration database is provided to store corresponding public private key pairs for authentication of encrypted data. Advantageously, the trust module of the present invention allows for secure communication and attestation across an unsecure network and a secure network.

In an embodiment, a control switch, such as an Ethernet switch, is positioned between the trust module and the networks. The trust module distributes public and private keys to the local encryption/decryption module of the networks through the Ethernet switch. The trust module authenticates the control information provided from the unsecure network and then propagates the authenticated rules to the plurality networks over the control channel through the Ethernet switch.

In another embodiment, there is provided a secure inter-network system that includes a trust module. The trust module is connected to multiple networks through a control channel over which to convey control information. The multiple networks each have a local encryption/decryption module to encrypt and decrypt data communicated among each other over a communication channel. The trust module is independent of the multiple networks and conveys the control information over the control channel to the local encryption/decryption module of the respective networks in order to manage authentication and rules for secure communication between and/or among the at least two networks.

In yet another embodiment, a method of providing secure communication between and among multiple networks is disclosed. A trust module is provided to manage secure communication between and among the multiple networks. An administrator is enabled access to the trust module in order to provide authorizations that define the secure communication rules between and among the networks. A control channel is provided over which to convey the communication rules. Secure communication rules are sent to the local encryption/decryption modules over the control channel, and a data channel, independent of the control channel, is provided over which the networks exchange data. Data is conveyed between or among the respective networks over the data channel in accordance with the secure communication rules received from the trust module.

BRIEF DESCRIPTION OF THE DRAWINGS

For a more complete understanding of particular embodiments and their features and advantages, reference is now made to the following description, taken in conjunction with the accompanying drawings, in which.

DESCRIPTION OF ILLUSTRATIVE EMBODIMENTS

Figure 1A:
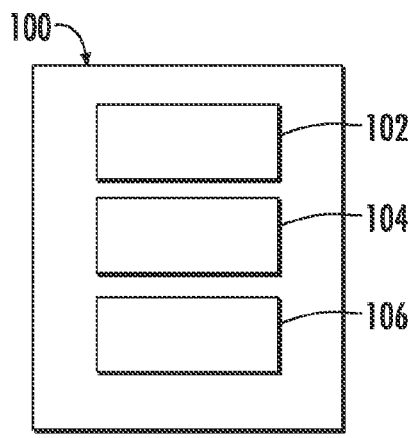
FIG. 1a is a block diagram illustrating a system implementing a trust module, in accordance with particular embodiments.
Figure 1B:
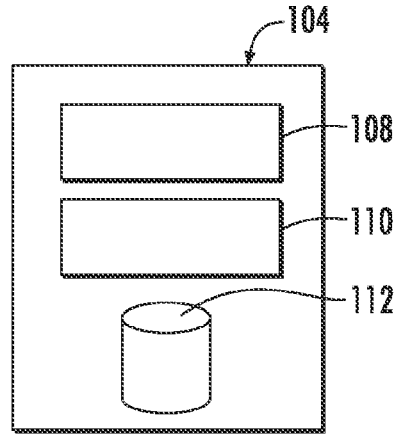
FIG. 1b is a block diagram illustrating a memory system for the trust module, in accordance with particular embodiments.

The invention advantageously uses a trust module 100 for remote administration and attestation of communication links between and among multiple n-network systems 301a-301n. Rather than requiring each network to specify its own security rules, the trust module 100 provides a common administration platform from which a security administrator may define or establish security rules that enable the networks, or users thereon, to exchange information according to a pre-defined security rules. Trust anchor 100 includes a computing device, such as a host computer, having a processor 102, memory 104, and interface 106, which work together to generate, receive, and/or process requests/responses from the n-networks 301a-301n for secure communication across the multiple networks. As described herein, each network has its own guard engine 310 that receives and processes control information from the trust anchor 100. Such control information is conveyed over an encrypted control channel 302 and may require authentication and encryption utilizing keys and algorithms supported by both the trust anchor 100 and the guard engines 310. Once the guard engines 310 are loaded with the appropriate security control information, data may then flow between or among networks over a data channel 304 in accordance with the authorization and encryption rules sent over the control channel 302. Advantageously, each network handles it own labor-intensive encryption and decryption, and only those networks authorized according to pre-designated security rules may intercommunicate. This way, non-secure or lesser secured networks or equipment may be bundled together with high security networks or equipment with less chance of security breaches.

The processor 102 processes information and signals received from a network administrator and/or one or more programs or applications running on the trust module 100. The processor 102 may include any suitable hardware, software, or both that operate to control and process signals. For example, the processor 102 may be a programmable logic device, microcontroller, microprocessor, any suitable processing device or resource, or any combination of hardware, software and/or encoded logic.

Memory 104 may be any form of volatile or non-volatile memory including, without limitation, magnetic media, optical media, random access memory (RAM), read-only memory (ROM), removable media, or any other suitable local or remote memory component. Memory 104 may store any suitable information to implement features of various embodiments, such as programs that may require one or more trust module functions and/or any instructions that may be needed to carry out one or more of the trust module functions. Memory 104 may store any suitable information to implethent features of various embodiments, such as encryption/decryption keys, identities, passwords, digital certificates, and/or state information.

In an embodiment, an encryption/decryption module 110 in the memory 104 is used to encrypt the communication rules before propagating these rules to the n-networks 301a-301n over the control channel 302 and decrypt communication received over the control channel 302. An administration module 108 in memory 104 combined with the key-database 112 in memory 104 generates and distributes public keys and stores a private key for authentication of encrypted data.

The trust module 100 has a user interface 106 that enables a human administrator to interact with the trust module 100 in order to define the rules by which the n-networks 301a-301n communicate and exchange secure communication over the data channel 304. The trust module 100 may be directly accessible by the network administrator as a host device, or the trust module 100 may be accessed via a serial connection to a separate computer.

The trust module 100 may include its own housing and any components (e.g., a processor and memory) necessary to provide the functionality described herein. In particular embodiments, the housing may be physically or materially constructed in a way to function to restrict or prohibit physical tampering with the internal components of trust module 100.

The trust module 100 may be coupled via a network switch 308 to the control channel 302 which is connected to multiple n-networks 301a-301n via wireless or wired connections. More specifically, connection may be a universal serial bus (USB) connection, an Ethernet connection, a peripheral component interconnect (PCI) connection, a memory bus connection, a serial connection, a Bluetooth connection, a radio frequency connection, or any other wired or wireless connection known in the industry.

Figure 2:
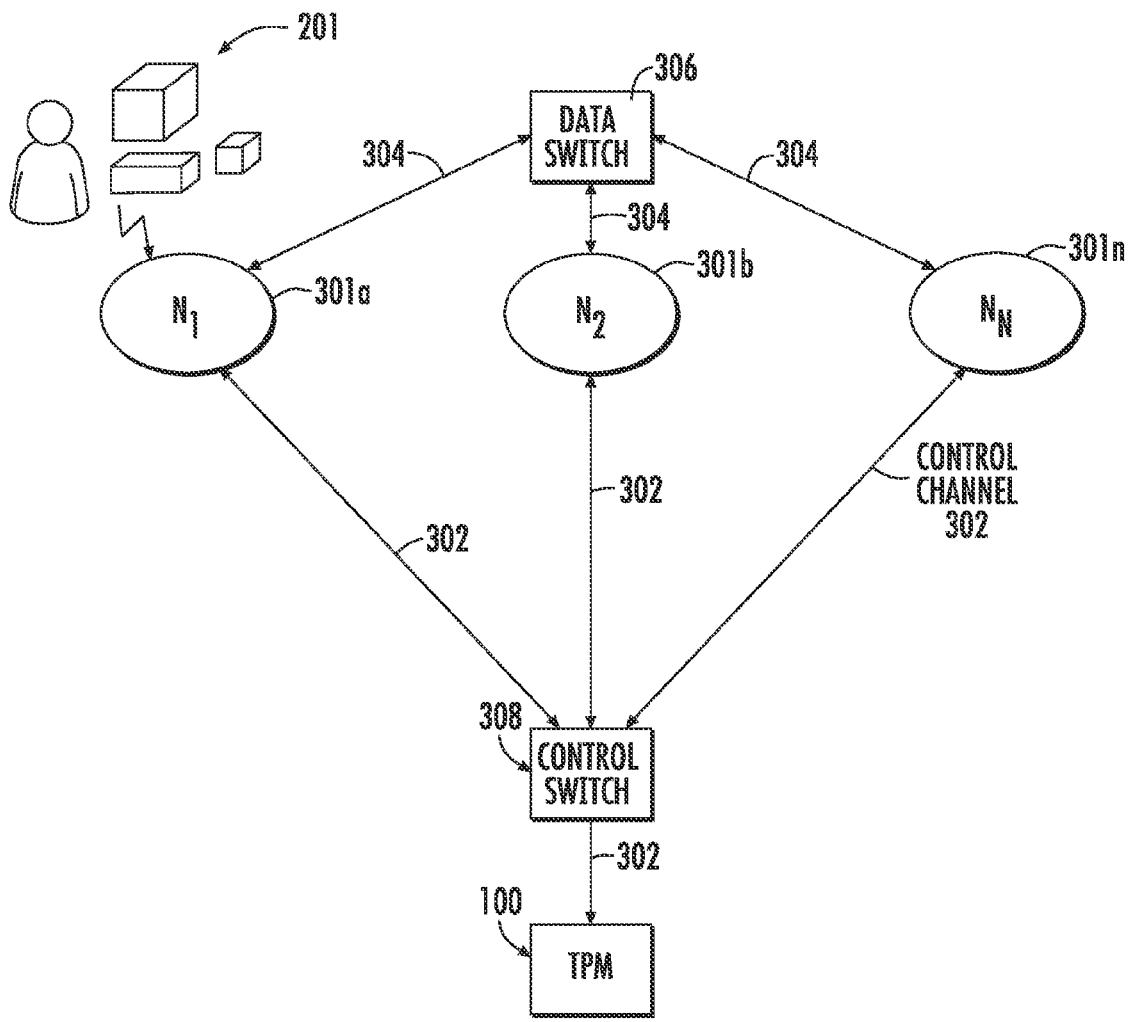
FIG. 2 is a block diagram illustrating the functional multiple network components of the system implementing the trust module, in accordance with particular embodiments.
Figure 3:
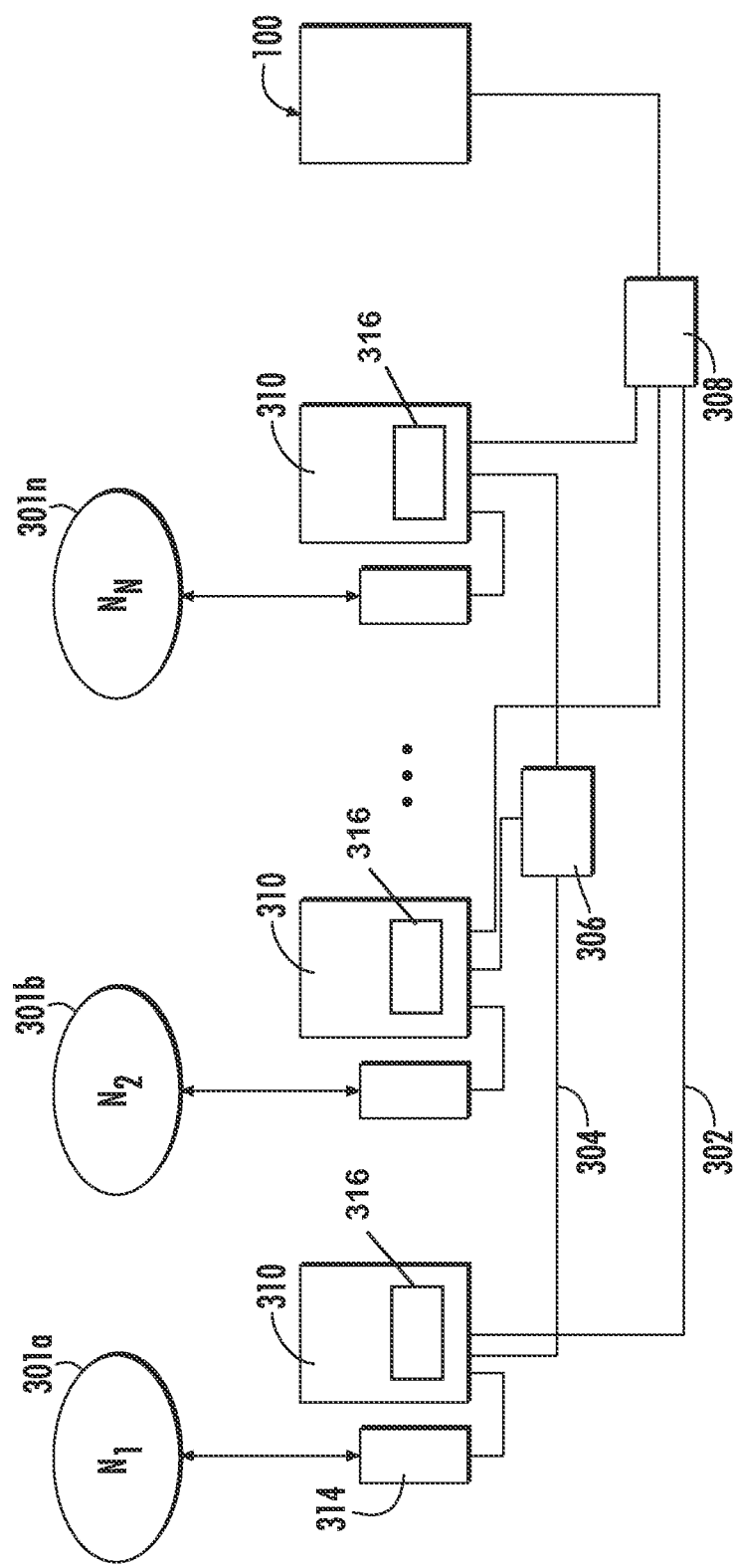
FIG. 3 is another embodiment of a block diagram illustrating the functional multiple network components of the system implementing the trust module, in accordance with particular embodiments.

Referring to FIGS. 2-3, a schematic diagram illustrates network interactions used for administration and attestation across multiple n-networks 301a-301n from a common secure trust module 102. Multiple n-networks 301a-301n are shown having one of many levels of security, including unclassified, secret, and top-secret. Each n-network 301a-301n communicates with other networks via its local gateway module 314 across the data channels 304 using the n-networks' 301a-301n local encryption and decryption algorithms implemented in a local encryption/decryption module 316. However, the rules by which the n-networks' 301a-301n communicate with each other are established by the trust module 100. Since, the trust module 100 does not receive data over the data channel 304, the trust module 100 is advantageously not a limiting component in the speed at which the n-networks 301a-301n transfer or exchange data with each other. This is achieved by keeping intensive encryption/decryption processing locally within each of the n-networks 301a-301n, but nevertheless establishing encryption and authentication rules by the trust module 100, which send control information or encryption rules over a separate control channel 302.

In an embodiment, the trust module 100 is remotely accessible by the network administrator from any one of n-networks 301a-301n via the network administrators host computer pre-authenticated with the trust module 100. The trust module 100 stores private key and generates and distributes public keys to the n-networks 301a-301n for communication with the trust module 100. A network administrator may access and manage authorizations provided by the trust module 100 from any location so long as the network administrator's host device 201 can be authenticated by the trust module 100.

In an embodiment, the network administrator may access the trust module 100 via an unsecure or unclassified network 301a. The network administrator's terminal 201 is pre-authenticated with the trust module 100. In other words, the administrator's terminal 201 uses a public key with which to encrypt control data or rules or to send a digital certificate for authentication. The rules are encrypted and then sent via the unsecure network 301a through the control channel 302 to the trust module 100 where the rules are decrypted by the encryption/decryption module 110 using the trust module's 100 private key stored in memory 104 and authenticated to verify the rules came from a trusted source. Any type of encryption/decryption algorithm may be employed, including message authentication codes, digital certificates or signatures, AES, triple DES, FIPS-140, WEP, 802.11i, or any other encryption standard. When the network administrator is authenticated, the network administrator can remotely administer any of the n-networks 301a-301n or cause the rules or control data to propagate from the trust module 100 to one or more of n-networks 301a-301n.

Figure 4:
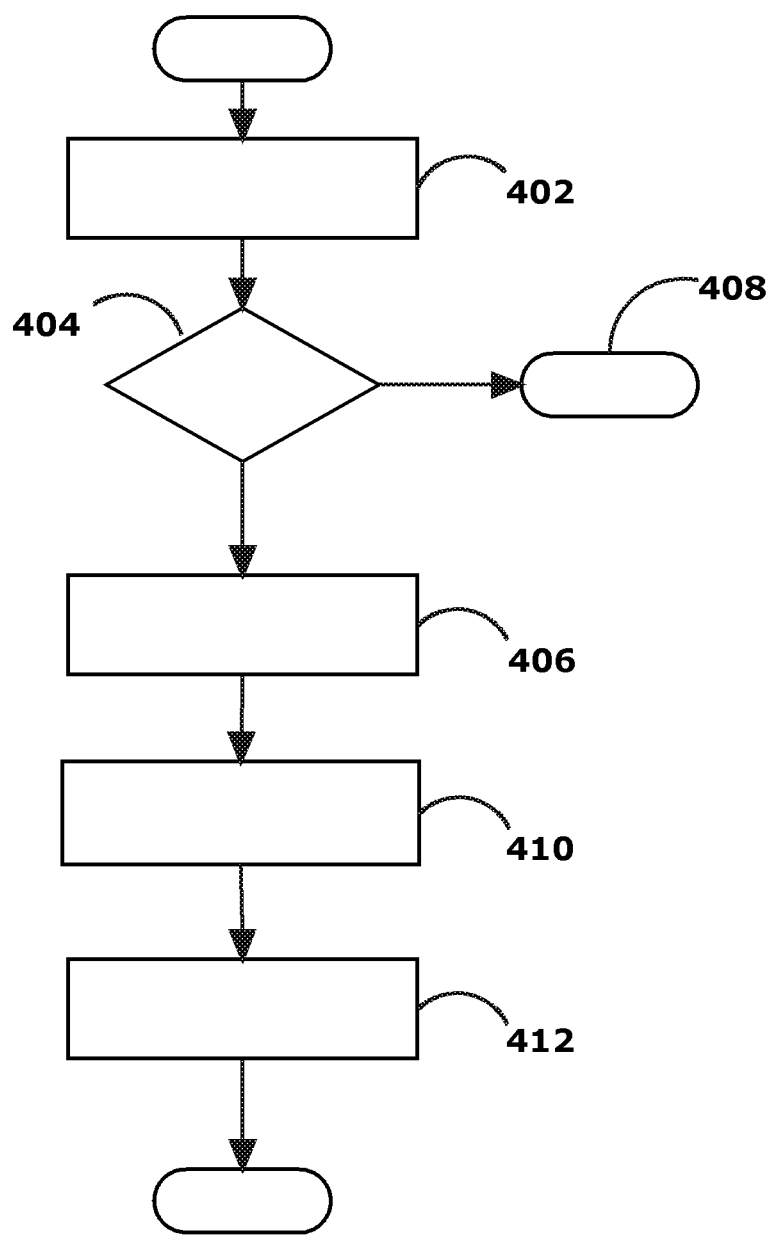
FIG. 4 is a flowchart illustrating a method for establishing a connection between the network administrator and the trust module for administration of the multiple network system.

FIG. 4 is a flowchart illustrating a method for establishing a connection between the network administrator and the trust module 100 for administration of the multiple n-networks 301a-301n. For purposes of this method it may be assumed that the network administrator has a functioning host device, including the processing, memory, and interfacing functions previously described. Further, it may be presumed that the host device is pre-authenticated with the trust module 100.

The method begins at step 402 where the network administrator attempts to access the trust module 100 from a remote location. At step 404 the trust module 100 authenticates the network administrator by receiving a digital certificate, keys, or any other embodiment for authentication. If authentication is unsuccessful the method proceeds to step 408 where the user is not allowed access. However, if authentication is successful the method proceeds to step 406 where the network administrator is able to provide rules by which the n-networks 301*a*-301*n* communicate with each other, authenticate new devices, or attestation of previously authenticated network components to the trust module 100. Next, the method proceeds to step 410 where the network administrator can then use the trust module 100 to distribute the new rules to the n-networks 301*a*-301*n*. Finally at step 412, when the network administrator is finished the network administrator disables the connection with the trust module 100. One skilled in the art would also recognize that the steps can be performed automatically by software rather than, on initiation by a network administrator.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents.

I claim:

1. A secure internetwork system comprising:
   at least two networks each having a local encryption/decryption module to encrypt and decrypt data that does not include security control information;
   a communication channel directly connecting the at least two networks over which the at least two networks communicate only data that does not include security control information to each other;
   a first control channel, independent of the communication channel, over which to convey only security control information;
   a second control channel, independent of the communication channel, over which to convey only security control information; and
   a trust module isolated from the communication channel so as to not receive data and independent of the at least two networks to convey the security control information over the first control channel to the local encryption/decryption module of one of the at least two networks and to convey the security control information over the second control channel to the local encryption/decryption module of another of the at least two networks in order to manage authentication and rules for secure communication between and/or among the at least two networks, wherein the security control information that is conveyed over the first control channel and the second control channel to the local encryption/decryption module of the at least two networks is isolated from the communication channel over which data is conveyed in order to prevent the security control information from being conveyed on a same channel as the data.

2. The secure internetwork system of claim 1, wherein the at least two networks, further comprise: an unsecure network and a secure network.

3. The secure internetwork system of claim 2, wherein the security control information is provided to the trust module from the unsecure network.

4. The secure internetwork system of claim 3, wherein the trust module authenticates the security control information provided from the unsecure network and then propagates the rules for secure communication to the at least two networks over the control channel.

5. The secure internetwork system of claim 1, wherein the trust module, further comprises: a control switch communicatively positioned between the trust module and the at least two networks.

6. The secure internetwork system of claim 1, wherein the trust module distributes public and private keys to the local encryption/decryption module of the at least two networks.

7. The secure internetwork system of claim 1, further comprising:
   a plurality of networks each having a local encryption/decryption module to encrypt and decrypt data, wherein each of the networks has a security level and at least one of the plurality of networks is an unsecure network and at least one of the plurality of networks is a secure network;
   an Ethernet switch communicatively positioned between the trust module and the plurality of networks; and
   wherein the trust module distributes public and private keys to the local encryption/decryption module of the plurality of networks through the Ethernet switch, and wherein the trust module authenticates the security control information provided from the unsecure network and then propagates the rules for secure communication to the plurality networks over the control channel through the Ethernet switch.

8. A method for providing secure communication between and among multiple networks, wherein each of the multiple networks has a local encryption/decryption module to encrypt and decrypt information that does not include security control information, the method comprising:
   providing a trust module to manage secure communication between and among the networks;
   enabling an administrator to access the trust module in order to provide authorizations that define secure communication rules between and among the networks;
   providing a first control channel from the trust module to the local encryption/decryption module of a first network of the multiple networks and providing a second control channel from the trust module to the local encryption/decryption module of a second network of the multiple networks, the first control channel and the second control channel convey only the secure communication rules;
   sending the secure communication rules to the local encryption/decryption modules over the control channel;
   providing a data channel independent of the control channel over which the networks exchange only data that does not include security control information; and
   isolating the trust module from the data channel so as to not receive data;
   conveying data between or among the respective networks over the data channel in accordance with the secure communication rules received from the trust module.

9. The method of claim 8, further comprising:
   authenticating at least two of the networks prior to enabling intercommunication therebetween.

10. The method of claim 8, further comprising:
encrypting the secure communication rules with the trust module prior to sending the secure communication rules to the local encryption/decryption modules of the respective networks.

11. The method of claim 10, further comprising:
decrypting the secure communication rules with the local encryption/decryption module.

12. The method of claim 8, further comprising:
propagating secure communication rules among a plurality of networks with one of multiple levels of security.

13. The method of claim 8, wherein in the step of sending the secure communication rules to the local encryption/decryption modules, further comprises:
sending the secure communication rules from an unsecured network.

14. The method of claim 13, further comprising:
authenticating the secure communication rules at the trust module.

15. The method of claim 14, further comprising:
propagating secure communication rules from the trust module to and/or among a plurality of networks with one of multiple levels of security.

16. A trust module for an internetwork communication system that includes at least two independent networks each having a local encryption/decryption module to encrypt and decrypt data that does not include security control information, a data channel over which the networks communicate only the data, a control channel to convey only security control information with each of the local encryption/decryption modules of the at least two independent networks, the trust module comprising:
an administration module to provide secure communication rules between and among the networks that define the manner in which the networks exchange secure communication over the data channel;
a user interface of the administration module to enable an administrator to define the secure communication rules;
an encryption module of the administration module to encrypt the secure communication rules; and
a first control channel entirely separate and independent of the data channel through which to send only the encrypted secure communication rules to the local encryption/decryption modules of a first network of the at least two independent networks and a second control channel physically separate from the first control channel and entirely and physically separate and independent of the data channel through which to send only the encrypted secure communication rules to the local encryption/decryption modules of a second network of the at least two independent networks, whereby to enable the respective networks to intercommunicate with each other according to rules defined by the administration module, wherein the trust module is isolated from the data channel so as to not receive the data.

17. The trust module of claim 16, wherein the control channel and the data channel are physical channels.

18. The trust module of claim 17, wherein the security control information is provided to the trust module from an unsecured network.

19. The trust module of claim 18, further comprising a key administration database, wherein the key administration database stores corresponding public private key pairs for authentication of encrypted data.

20. The trust module of claim 17, further comprising:
an Ethernet switch communicatively positioned between the trust module and the at least two independent networks; and
wherein the trust module distributes public and private keys to the local encryption/decryption module of the at least two independent networks through the Ethernet switch, and wherein the trust module authenticates the security control information provided from an unsecured network and then propagates the rules for secure communication to the at least two independent networks over the control channel through the Ethernet switch.

* * * * *